United States Patent
De Corso

[15] 3,680,163
[45] Aug. 1, 1972

[54] NON-CONSUMABLE ELECTRODE VACUUM ARC FURNACES FOR STEEL, ZIRCONIUM, TITANIUM AND OTHER METALS AND PROCESSES FOR WORKING SAID METALS

[72] Inventor: Serafino M. De Corso, Media, Pa.
[73] Assignee: Westinghouse Electric Corporation, Pittsburgh, Pa.
[22] Filed: Aug. 27, 1969
[21] Appl. No.: 870,760

Related U.S. Application Data

[62] Division of Ser. No. 717,560, April 1, 1968, Pat. No. 3,586,348.

[52] U.S. Cl. .................................13/9, 13/18, 13/31
[51] Int. Cl. ..............................................H05b 7/08
[58] Field of Search................13/9, 31, 18; 266/34 V

[56] References Cited

UNITED STATES PATENTS 3,501,290   3/1970   Finkl et al. ...............266/34 V X
3,501,289   3/1970   Finkl et al. ...............266/34 V X Primary Examiner—Bernard A. Gilheany
Assistant Examiner—R. N. Envall, Jr.
Attorney—A. T. Stratton, C. L. McHale and M. I. Hull

[57] ABSTRACT

Degassing apparatus similar to that employed in the D-H process includes means for producing an electric arc of controllable power within the vacuum degassing chamber during the degassing operation to supply heat to the molten material. The electrode includes means forming a fluid cooled arcing surface and a magnetic field coil for setting up a magnetic field so oriented with respect to the arc that a force is exerted on the arc which substantially continuously moves the arc along the arcing surface thereby reducing evaporation of material from the arcing surface and resulting in a more even distribution of heat to the molten metal within the vacuum chamber.

11 Claims, 12 Drawing Figures

PATENTED AUG 1 1972 3,680,163

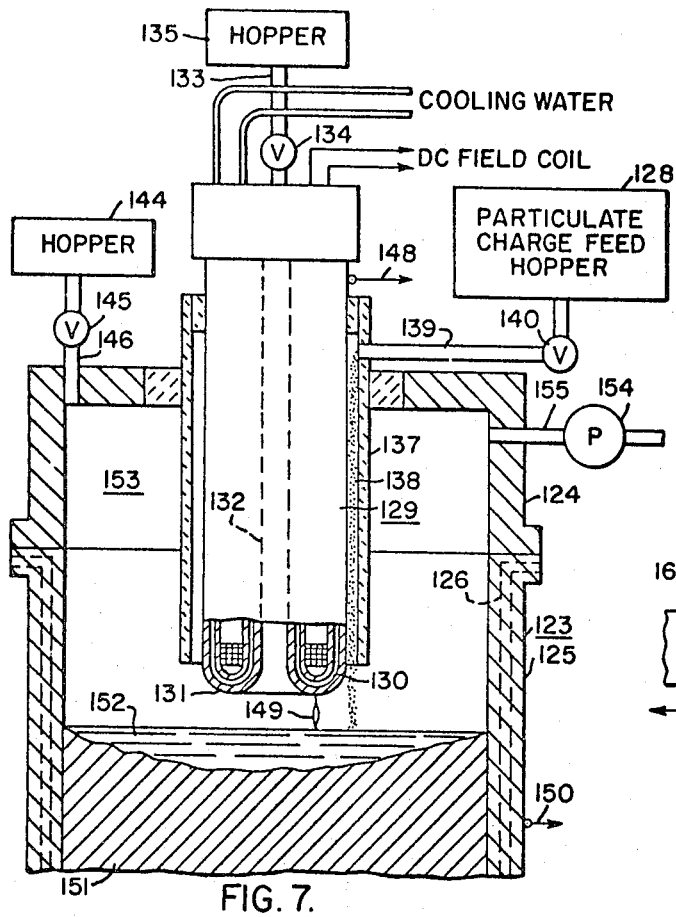

3,680,163

NON-CONSUMABLE ELECTRODE VACUUM ARC FURNACES FOR STEEL, ZIRCONIUM, TITANIUM AND OTHER METALS AND PROCESSES FOR WORKING SAID METALS

This application is a division of copending application Ser. No. 717,560, filed Apr. 1, 1968, now U.S. Pat. No. 3,546,348 and assigned to the assignee of the instant invention.

Vacuum furnace apparatus employs one or more non-consumable electrodes and controlled material feed at one or more locations; coordinated material feed and ingot movement which provides for continuous casting; a new and improved feeding mechanism including separate material feed hoppers where alloys are being cast; vacuum chamber apparatus including a tilting furnace, a lock for receiving a ladle, a lock for material charging; and the use of a magnetic field created in the electrode for stirring the melt. Processes for manufacturing zirconium or zircaloy ingots by melting the sponge, sponge and scrap, or scrap pellet, reduce impurity levels, provide controlled arc movement, may employ feeding mechanism using inert gas to transport a particulate charge to the arc site, obviate the expense of forming an electrode of the material to be charged, permit a power input relatively independent of charged material thereby providing more predictable heating of the ingot surface, make continuous casting possible by coordinating the charge feed rate and ingot movement, facilitate arc casting and materials which are not good electrical conductors by providing an arrangement in which the charge material need not carry current until it has been in the heated state in the ingot; permit lower pressures obtainable at the arc site, provide for gas admission at the electrode site, electrically insulate the mold from the electrodes, provide readily controllable arcing gap and arc characteristics, provide a vacuum furnace in which the melting furnace and pouring ladle are enclosed in a large vacuum chamber and the charging of scrap and pouring of the melt are accomplished by the use of locking chambers through which material may be moved. Further charge material may be added to the furnace through the electrode structure itself.

CROSS REFERENCE TO RELATED APPLICATIONS

This application is related to an application Ser. No. 407,332 filed Oct. 29, 1964 by A. M. Bruning for "Electric Arc Furnace and Non-Consumable Electrode Suitable for Use Therein" now abandoned; Ser. No. 484,799, filed Oct. 6, 1966 by S.M. DeCorso et al for "Process for Iron Ore Reduction and Electric Furnace for Iron Ore Reduction Having at Least One Non-Consumable Electrode" now U.S. Pat. No. 3,381,540; application Ser. No. 584,798, filed Oct. 6, 1966 by A. M. Bruning et al for "Electrode Heated Oxygen Steel Furnace and Process for Producing Steel" now Pat. No. 3,556,771; an application of S.M. DeCorso et al for "Small Diameter Fluid Cooled Arc-Rotating Electrode", Ser. No. 663,714, filed Aug. 28, 1967 now U.S. Pat. No. 3,377,418; and Ser. No. 554,427, filed June 1, 1966 by S. M. DeCorso et al for "Copper Ore Reduction and Metal Refining Process and Apparatus for Use Therein now abandoned, all of the above-identified copending applications being assigned to the assignee of the instant invention.

BACKGROUND OF THE INVENTION

1. Field of the Invention

The invention relates to apparatus and processes for obtaining, treating and working metals in a vacuum including steel, tungsten, molybdenum, tantalum, columbium, zirconium, titanium and others.

2. Description of the Prior Art

Some of the apparatus and processes described and claimed herein relate to improvements in the D-H process, well known in the art and described in the literature of the art including an article entitled "The D-H Vacuum Process For Molten Steel" by P. J. Wooding and W. Sieckman, Transactions of the Vacuum Metallurgy Conference, 1960, pp. 243–252. One of the disadvantages of the prior art D-H process results from the fact that the steel tends to cool as it is being degassed and present techniques involve preheating of the vacuum vessel and heat addition by resistance heating within the vacuum vessel. I overcome these disadvantages by providing a non-consumable electrode or electrodes within the vacuum vessel to supply heat to the molten material in the vacuum vessel during the degassing operation which renders unnecessary separate preheating of the vacuum vessel, renders unnecessary superheating of steel before the process is begun, provides for an increased steel movement rate (degassing rate), and permits a prolonged spraying time to produce better steel.

In other embodiments of vacuum furnace apparatus according to my invention, and which may be used in practicing the processes of my invention, I overcome many limitations and disadvantages of prior art furnace processes and apparatus. For example, in conventional vacuum furnace operation it must be feasible to form the material to be charged into an electrode shape; the forming of electrodes from certain refractory metals is difficult and costly, in some cases requiring compacting at half pressures and requiring welding some gas or impurity is brought into the furnace within the electrode, making it difficult to keep impurity levels of the formed electrode low; the power input and voltage current characteristics of the arc in prior art furnaces is usually a function of the material and method of forming the electrode, and the power input to the furnace cannot be varied independently of electrode consumption; consumable electrode operation is almost invariably direct current and wide variation occurs in the allocations of heating between electrode and ingot, depending upon the metals to be melted. It has been found in practice that some metals heat up more while acting as anodes while other metals heat up more while acting as cathodes; occasional instability occurs leading to arcing to the mold, which structure cannot withstand the resulting heating; materials of poor electrical conductivity such as boron and silicon present difficulties for consumable electrode operation and require preheating before suitable current flow may be established.

I overcome these disadvantages by a number of unique and novel features; I provide a non-consumable electrode or electrodes in which the arc is caused to move over the electrode face by action of a magnetic field generated for this purpose about the electrode face. This broad idea constitutes no part of the instant invention, having been described and claimed in the aforementioned copending application of A.M. Bruning, and further described and claimed in a copending application of S. M. DeCorso et al. for "Non-Consumable Arc Electrode", Ser. No. 407,327, filed Oct. 29, 1964.

I provide material feed in the form of powder, pellets, wire or rod. In the case of wire or rod feed, the main arcing capability remains with the electrode face, so that arcing performance does not depend on the materials surface or current conducting properties; thus the feeding method is concerned primarily with getting material to the arcing zone, and the material being fed does not play any primary role in the arcing action. Feeding action may be continuous or intermittent. In one or more embodiments I use a lock hopper where particulate material is fed.

I provide controlled arc movement to provide stabilization and permit operation on either alternating current or direct current power. Furthermore, the magnetic flux set up by the electrode field coil reacts with the current path to cause stirring of the melt. The stirring is very important for improved refining in particular in large ingot or furnace sizes.

I provide controlled material feed location to assist arc stabilization and/or to provide radiation shielding between arc and walls of the mold. My apparatus and processes employ coordinated material feed and ingot movement to provide for continuous casting, which will reduce losses at ingot ends or skulls and reduce down time losses for installing electrodes and removing ingots.

The non-consumable electrode design which I employ is such that the material being melted splashes or is transported to the electrode face, forming a coating thereon which serves as thermal insulation and serves to protect the electrode face from arc action. This has been observed in practice on electrodes employed in utilizing my invention.

I employ as an electrode face material copper or copper with refractory metal coatings and other metals having similar characteristics.

My feeding mechanism or mechanisms may include the use of inert gas to transport a particulate charge to the arc site.

While alloys are being cast the desired composition may be attained by use of separate material feed hoppers, or by using a single hopper with the charge well mixed. In either case the alloy composition may be readily altered from one casting to the next, a change not readily accomplished when the alloy must be formed into a consumable electrode.

Summarizing the many advantages which accrue from the apparatus and processes of my invention: the necessity and expense of forming an electrode of the material to be charged is obviated; power input may be made relatively independent of charged material thereby providing more predictable heating of the ingot surface than is now obtainable with consumable electrodes; a feature which reduces the cost of design and installation of power supplies for each furnace by substantially removing a variable which can be unpredictable, namely the bulk and surface electrical properties of the consumable electrode; continuous casting is possible where the charge feed rate and ingot movement are coordinated as they may be in the apparatus and processes of my invention, thus reducing the cost of handling and placing the consumable electrodes, and reducing ingot end losses; improved purity may be obtained due to reduced impurity levels possible in a particular charge and secondly due to the ability to do extended refining by operating at low charge feed rates in relation to power input; arc casting of materials which are not good electrical conductors is facilitated by the use of the nonconsumable electrode since the charge material need not carry current until it is in the heated state in the ingot; arc stabilization is obtained by the location of the charge feed since the charge feed stream presents a low impedance path for the arc; in alternating current operation, as compared to present direct current operation, the cost of rectifiers is saved because for large furnaces three phase operation is possible by the use of three electrodes; by using a non-consumable electrode structure which is hollow in cross section, additional gas flow area is available along the axis of electrode-mold and consequently lower pressures are obtainable at the arc site and this in turn increases the purity level of the ingots; gas addition at the electrode site to influence arc behavior is easily accomplished by my non-consumable electrode and this is true also for gas addition for the purpose of chemical reaction with the metal charge or impurities in the charge.

For simplicity of illustration I have shown apparatus illustrating my invention and suitable for practicing the processes of my invention in simple form; my invention includes the use of all additional metal handling and metal processing apparatus of conventional design now well known in the art.

BRIEF DESCRIPTION OF THE DRAWINGS

FIG. 7 shows a non-consumable electrode for producing an ingot in a mold with a plurality of hopper means for feeding particulate material to the melt, down the side of the mold, through a central aperture in the electrode, and in the space between the electrode and a cylindrical sleeve surrounding the electrode.

FIG. 8 shows a mold employing non-consumable electrodes for continuous casting.

FIG. 9 shows apparatus for forming an ingot in a mold in which feed material is fed to the melt through a central axially extending passageway in the electrode or electrodes.

FIG. 10 shows a mold for forming an ingot in which two coaxially disposed non-consumable electrodes are employed for producing an arc which melts the material in the mold.

DESCRIPTION OF THE PREFERRED EMBODIMENTS

Figure 1:
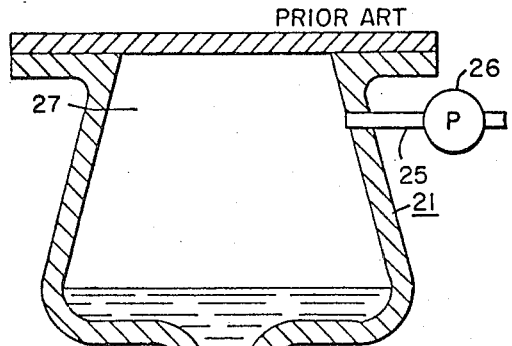
FIG. 1 shows apparatus for practicing the D-H process according to the prior art.

Particular reference is made now to FIG. 1 which shows apparatus for practicing the aforementioned D-H process according to the prior art. For simplicity of illustration the vacuum treatment vessel and the ladle are shown as being formed of metal but it will be understood that in practice both of these are lined with refractory material or are fluid cooled. The treatment vessel is generally designated 21 and the ladle is generally designated 22. Nozzle 24 of the treatment vessel extends into the melt 23 and a portion of the melt is shown as having been sucked into the treatment vessel 21 as a result of partially evacuating the vessel through conduit 25 connected to vacuum pump 26. When the chamber 27 of the vacuum vessel 21 is evacuated, the pressure of the atmosphere on the upper surface 28 of the melt 23 forces the molten metal up through the nozzle into the treatment vessel. Molten material 23 may be referred to in the claims as a volume of material to be treated. Cyclic variation of the emersion depth of the suction nozzle forces successive portions of the melt, which may be steel or some other metal which it is desired to purify, into the evacuated chamber where it is degassed, the impurities therein having vapor pressures which are less than the vapor pressure of the material of the melt, the volatilized impurities being removed by the vacuum pump 26. Pump 26 may run continuously intermittently, or chamber 27 may be evacuated before the process is begun. For a fuller understanding of the prior art D-H process, reference may be had to the aforementioned article by Wooding and Sieckman.

One of the fundamental requirements for effective gas removal is a large surface area exposed to the vacuum, and unfortunately this is also the best possible way to lose temperature very quickly. Accordingly, prior art apparatus requires some effective means for preventing radiation loss from the metal. This is accomplished by heating the vessel to the temperature of the molten steel. Prior art apparatus employs resistive heating for the vacuum vessel. Additional requirements are that the bath must be shallow with as large as possible a surface area, and a space must be provided for the violent turbulence which occurs during treatment. Oxygen, hydrogen and nitrogen may be removed from the melt in the vacuum vessel, hydrogen and oxygen sampling being accomplished by the well known immersion mold method and analysis by vacuum fusion. Also chemical determination of the oxygen content may be employed.

Figure 2:
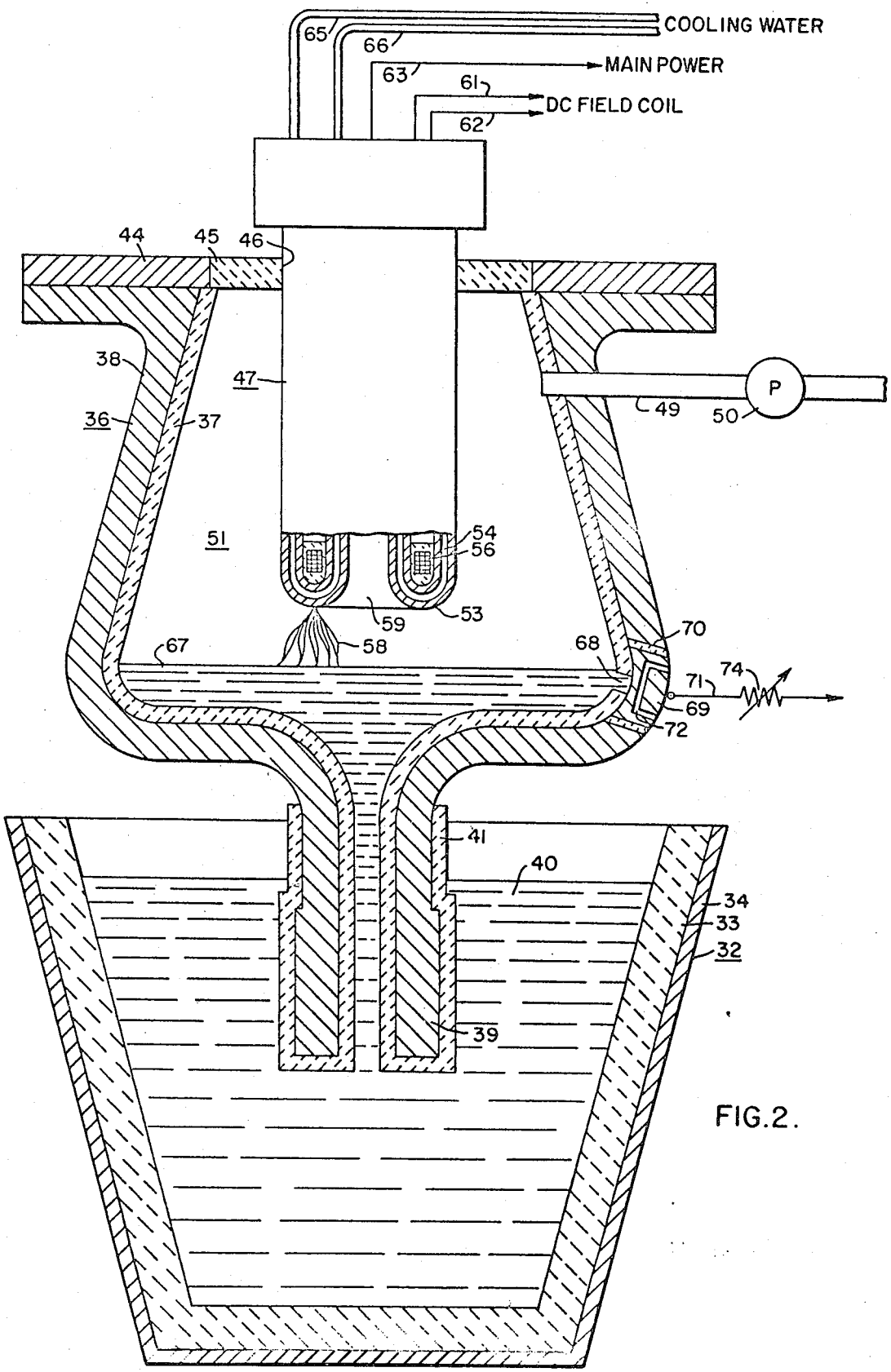
FIG. 2 shows apparatus for practicing an improved process according to my invention similar to the D-H process, in which a non-consumable electrode in the vacuum vessel supplies heat during the degassing operation.

Particular reference is made now to FIG. 2 where my improved apparatus for practicing my improved D-H process is shown. Ladle 32 is seen as having a refractory inner lining 33 and an outer shell of metal 34. The vacuum or treatment vessel generally designated 36 has a refractory inner lining 37, an outer shell of metal 38, and a nozzle 39 extending into the melt 40, the nozzle 39 not only having a refractory lining on the inside thereof but having a refractory lining portion 41 on the outside thereof. It will be understood that means, not shown for convenience of illustration, is provided for adjusting the position of the nozzle vertically so that various portions of the melt may be sucked up into the vacuum vessel or forced up into the vacuum vessel as a result of atmospheric pressure on the upper surface of the melt.

Conduit 49 connects vacuum pump 50 to the interior chamber 51 of the vacuum vessel. Pump 50 may run continuously, intermittently, or chamber 51 may be evacuated before the process begun.

Cover 44 for the vacuum vessel has a portion 45 composed of insulating material with a bore 46 therein through which passes a non-consumable electrode generally designated 47. It will be understood that means, not shown for convenience of illustration, is provided for raising and lowering the electrode to provide the desired arc length between the electrode arcing surface and the melt in accordance with the level of the melt in the vacuum vessel.

The non-consumable electrode is seen to include means forming an arc surface 53 which is fluid cooled by fluid flow passageway or passageways 54 near the arcing surface and that the electrode tip which includes the arcing surface forming means has a magnetic field producing coil 56 disposed therein which sets up a magnetic field which causes the arc 58 to move substantially continuously around the annular arcing surface 53. Arc 58 is shown as being a multiple arc or diffused arc as frequently occurs, in practice. The electrode is seen to have a central passageway 59 which may extend through the entire electrode if desired, the upper end being closed by means, not shown for convenience illustration, to prevent the loss of heat therefrom. Leads 61 and 62 bring current for energizing the aforementioned field coil 56; lead 63 is connected to one terminal of a source of potential which produces the arc 58. It is understood that the supporting column portion of the electrode includes conductive means extending from the lead 63 to the metallic arcing surface 53 to complete a current path. Conduits 65 and 66 pass through passageways in the electrode, not shown for convenience of illustration, and communicate with the aforementioned passageway or passageways 54 in the electrode tip for bringing cooling fluid to the tip and conducting fluid therefrom. The non-consumable electrode itself forms no part of the instant invention; suitable non-consumable electrodes are described in several copending patent applications assigned to the assignee of the instant invention including an application for "Non-Consumable Arc Electrode" by S. M. DeCorso et al., Ser. No. 407,327, filed Oct. 29, 1964, and an application for "Electrode" by S. M. DeCorso, Ser. No. 479,965, filed Aug. 16, 1965.

In order to complete an electric circuit to the melt 67 the refractory lining 37 is seen as having a gap or hole 68 therein adjacent a portion of the metal shell 69 which is insulated from the remainder of the metal shell by encircling insulating means 70. Wall portion 69 is fluid cooled as by fluid flow passageway 72 connected to suitable fluid inlet and outlet means, not shown for convenience of illustration, and wall portion 69 has lead 71 connected thereto, lead 71 being connected by way of rheostat 74 to the terminal of opposite polarity of the source of potential which produces the arc 58. The melt 69 passes through the hole 68 and makes electrical contact with metallic wall portion 69 completing a current path.

Where leads 63 and 71 are connected to a source of direct current to produce the arc 58, preferably the electrode 47 is the anode, because it has been found in practice that an electrode connected to form the anode of a direct current circuit undergoes less wear than a similar electrode connected to form the cathode.

Means is provided for adjusting the current which produces the arc 58, symbolized by rheostat 74 in lead 71.

My invention obviates the necessity for separate preheating of the vacuum vessel required in the prior art D-H process as previously explained. By adjusting the amount of heat supplied to the melt 67 I maintain the melt at any desired temperature most effective for the desired degassing operation. Furthermore, no super heating of the steel or other liquid or molten metal is necessary; superheating to provide for loss of heat in the vacuum vessel results in an unnecessary and wasteful expenditure of electrical power. Furthermore, by adjusting the power of the arc and the time that the arc takes place, the steel movement rate, that is, the degassing rate may be increased, as will readily be apparent, because I can quickly adjust the temperature of that portion of the melt within the vacuum vessel to provide for an optimum degassing rate. Furthermore, since because of the arc which I supply to the molten metal in the vacuum vessel, there is no substantial loss of heat therefrom, the spraying time that any particular portion of the metal is in the vacuum chamber may be prolonged produces better steel, purer metals, etc.

Figure 3:
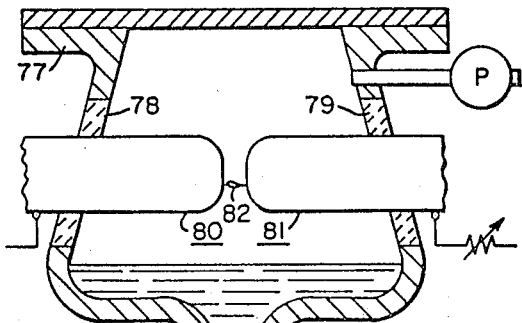
FIG. 3 shows an improved vacuum vessel in which two non-consumable electrodes have an arc therebetween for supplying heat to the molten material.

Reference is made now to FIG. 3, where for simplicity of illustration only the vacuum vessel is shown. For simplicity of illustration the vacuum vessel is shown as having walls of metal but it will be understood that the walls are fluid cooled or that there is a refractory lining similar to the refractory lining of FIG. 2 covering the entire inside including the inside of the nozzle and also the outside of the nozzle. In FIG. 3, the vacuum vessel 77 has oppositely disposed wall portions 78 and 79 composed of insulating material through which pass two non-consumable electrodes generally designated 80 and 81, which it is understood are connected to terminals of opposite polarity of a source of potential, not shown for convenience of illustration, to produce the arc 82. The arc 82 supplies the necessary heat to the molten material in the vacuum chamber, the arc current being adjustable. FIG. 3 has the advantage that it is not necessary to form an electrical connection to the molten steel or other molten steel metal material in the vacuum chamber.

Figure 4:
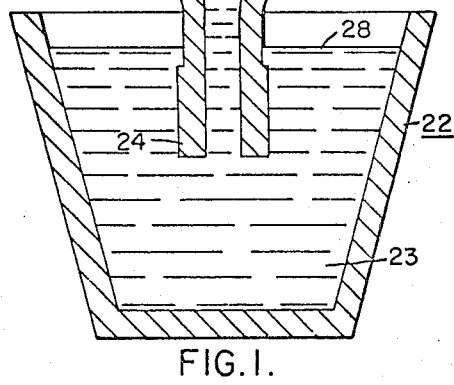
FIG. 4 illustrates in plan view the top of a vacuum vessel having three non-consumable electrodes arranged in a triangular pattern for supplying heat to the material in the vacuum vessel during the degassing operation, the three electrodes being connected to the three phases of a three phase source. Such an electrode arrangement may also be used where an ingot is to be formed.

Particular reference is made now to FIG. 4 where a plan view of a vacuum vessel generally designated 85 is shown having an insulating portion 92 in the top cover thereof through which pass three non-consumable electrodes generally designated 86, 87 and 88, which it is understood extend toward the molten liquid in the vacuum vessel and produce arcs thereto, the electrodes being connected by leads 89, 90 and 91 respectively to a three phase source of alternating current potential. By utilizing three electrodes connected to a three phase source economies in power consumed may be effected as well as increasing the heating capacity which may be supplied to the molten material in the vacuum vessel.

Figure 5:
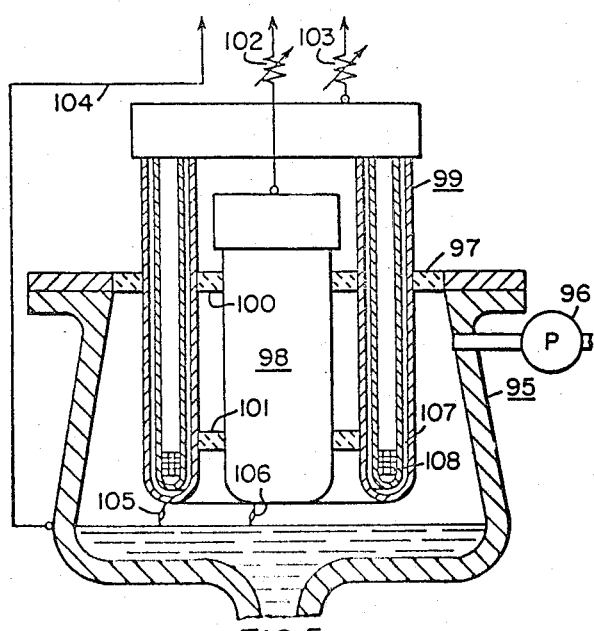
FIG. 5 shows an improved vacuum vessel suitable for practicing an improved process in which two concentric non-consumable electrodes produce two arcs to the molten metal in the vacuum vessel, or an arc between electrodes.

Particular reference is made now to FIG. 5; vacuum vessel 95 has a vacuum pump 96 connected thereto and has in the cover thereof an insulating portion 97 through which pass two non-consumable electrodes coaxially mounted with respect to each other, the electrodes being designated 98 and 99 and spaced from each other by annular spacer members 100 and 101. Leads 102, 103 and 104 electrically connect the two electrodes and the melt respectively to a source of potential for producing arcs 105 and 106 from the electrodes to the molten metal. Electrode 98 may be similar to electrode 47 described in connection with FIG. 2; electrode 99 is seen to have fluid flow passageway or passageways 107 for conducting cooling fluid past the arcing surface and a field coil 108 for causing the arc 105 to rotate around the annular arcing surface. It will be understood that means, not shown for convenience of illustration, is provided for simultaneously raising and lowering the electrodes 98 and 99 as the level of molten material in the vacuum chamber changes, and also to provide the desired arc length, and that means, not shown for convenience of illustration, is provided for individually adjusting the powers of the arcs 105 and 106.

Likewise it will be understood that means is provided for raising and lowering the electrodes 86, 87 and 88, FIG. 4.

Figure 6:
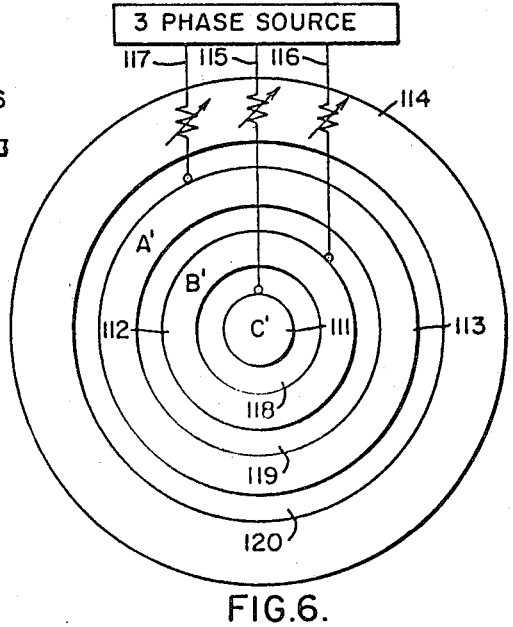
FIG. 6 is a plan view of a vacuum vessel in which three concentric electrodes are employed, the three electrodes being connected to the three phases of a three phase source. Such an electrode arrangement may also be used where an ingot is to be formed.

Particular reference is made now to FIG. 6 where three concentric electrodes 111, 112 and 113 are seen mounted in the cover 114 of a vacuum chamber, connected by leads 115, 116 and 117 respectively to a three phase source of potential and separated from each other by annular insulating members 118, 119 and 120 and also from the metallic portion of the cover.

Further, with respect to all of the embodiments of FIGS. 2 through 6 inclusive, it will be understood that the material in the ladle may be a tap from an electric furnace or it could have come from a basic oxygen furnace. After the molten material is purified by the degassing operation to the desired state of purity as ascertained by many tests well known in the art, the ladle may be lowered and removed to a desired operating position where ingots may be poured from the purified molten metal. As previously stated, the vacuum vessel is preferably lined with refractory material or fluid cooled by fluid passageways in the wall thereof.

As previously stated the embodiments described hereinbefore which employ two or more electrodes offer the advantage of not having to make electrical connection to the molten metal, and as previously stated they obviate the necessity for making the electrode the anode where a direct current is employed, it having been found in practice that when an electrode forms the anode it is subject to less wear than when it is connected to form the cathode of the circuit.

The embodiments of FIGS. 2 through 6 inclusive can be used to purify any metal containing impurities having vapor pressures which would be removed by the process.

Particular reference is made now to FIG. 7 which shows apparatus for producing an ingot in a mold. FIG. 7 will be described with reference to the use of the metal titanium to produce an ingot therefrom, but it will be understood that it can be used to produce metals which are treated in vacuum furnaces, these including tungsten, molybdenum, tantalum, columbium, zirconium, as well as titanium and other rare metals. In FIG. 7 the mold is generally designated 123 and is shown in upper and lower detachable sections 124 and 125, the lower section being fluid cooled by passageway 126; the mold generally designated 123 has a detachable base, not shown for convenience of illustration, but which may be constructed according to well known prior art practices; after the ingot is formed and allowed to cool it shrinks an appreciable distance from the wall of the mold, for example a quarter of an inch around the periphery of the ingot, and thereafter the sections of the mold are disconnected, the base is removed, and the ingot slipped from the mold in accordance with conventional practice.

For general information regarding the production, extractive metallurgy, and processing and fabrication of titanium, reference may be had to a work entitled "Rare Metals Handbook" Second Edition, edited by Hampel, Reinhold Publishing Corp., 1961, pages 559—579 inc. On page 561 of that work there is shown a simplified flow sheet for the extraction and refining of titanium, and one stage includes the production of massive sponge titanium which is crushed to provide particulate matter for feeding to a vacuum furnace for producing an ingot. FIG. 7 shows a hopper 128 containing particulate titanium sponge. A non-consumable electrode generally designated 129 has a fluid passageway 130 for conducting heat flux from the arcing surface 131 and an axially extending passageway 132 therethrough communicating by way of conduit 133 and valve 134 with an additional hopper 135 so that particulate charge may be fed to the molten liquid through the axial passageway through the electrode. Surrounding the electrode and spaced therefrom is a cylindrical jacket 137 forming an annular cylindrical passageway 138 which communicates by conduit 139 and valve 140 with the aforementioned hopper 128 so that particulate matter may be fed to the molten pool 142 through the annular passageway between the jacket and the electrode.

A still further hopper 144 is provided connected by valve 145 and conduit 146 to introduce particulate charge feed around the wall of the mold. Lead 148 symbolizes means for connecting the electrode to one terminal of a source of potential to produce the arc 149, the molten pool forming the surface of opposite polarity and being connected to the other terminal of the source of potential through the mold and/or ingot and lead 150. The portion of the ingot designated 151 designates the relatively cooled and hardened portion. The molten pool is designated 152. The chamber within the mold is designated 153 and is evacuated by vacuum pump 154 connected to the chamber by conduit 155.

As will be readily understood, as particulate matter is added to the molten pool, the level of the pool gradually rises within the mold, so that the electrode is gradually withdrawn upward as the height of the ingot increases.

In accordance with certain specifications and usages in the titanium industry, it is sometimes required that the ingot be remelted a second time to further reduce the amount of impurities therein and to provide improved homogeneity in the ingot. It is usual to employ the ingot itself as an electrode in the second remelting operation, that is, as a consumable electrode which is consumed during the process. On the other hand it is usual to employ a non-consumable electrode in the first ingot forming operation where the ingot is formed in a mold in a manner heretofore described. The non-consumable electrode of my invention offers many advantages over the use of a graphite electrode employed as a non-consumable electrode. Generally a graphite electrode must be operated under limited and carefully controlled conditions to keep it substantially non-consumable during the ingot forming process. One of these undesirable conditions is that a graphite electrode must be kept a certain minimum distance from the melt, or the melt splashes on the electrode, erodes graphite from the electrode, and takes the graphite back into the melt with it, forming titanium carbide, an undesired impurity. Furthermore, where a graphite electrode is employed as the non-consumable electrode, the chamber cannot be evacuated below about 20 or 30 millimeters of pressure, because at pressures below this figure the graphite itself vaporizes.

My non-consumable electrode ingot forming apparatus suffers from none of these disadvantages.

A typical average temperature which the copper surface of the electrode face member might reach in practice would be 600° to 800° F, representing heat flux removal at the rate of $4 \times 10^6$ B.T.U./hr./ft$^2$ for a certain thickness range of the copper arcing surface. At this temperature of 800° F the vapor pressure of copper is less than $10^{-8}$ atmospheres. It will be readily seen that a mold having a non-consumable electrode with a copper arcing surface can be evacuated well below 20 millimeters of pressure, the lower limit for a graphite electrode, thereby increasing greatly the rate of impurity removal, so that removed impurities do not recondense within the mold and fall back into the melt. Assuming a temperature of 3,000° F for the melt, one which might be reached in practice, a mold having a non-consumable copper electrode can be evacuated to a level which would result in the removal of certain impurities which would not be removed at all at 20 millimeters of pressure, the vapor pressure or partial pressure of the impurity being below 20 mm. at 3,000° F.

The apparatus of FIG. 7 also has the one polarity advantage heretofore mentioned in that when the electrode is operated as an anode the useful life thereof is prolonged.

When the ingot 151 has reached the desired length, the power to the arc is shut off, allowing the ingot time to cool, the mold dismantled and the base removed, and the ingot slipped therefrom either for further processing by remelting as aforedescribed or for other processing.

Particular reference is made now to FIG. 8 which shows an embodiment of my invention for continuous casting; as the ingot forms, the rigid part is gradually moved into the vacuum enclosure. It is seen that the mold generally designated 158, FIG. 8, has a wall portion 157 and a retractable bottom 159, which moves axially with respect to the wall of the mold and has retracting or moving means 160 secured thereto. Means 160 may be slidable in a bore or opening in a removable base of the mold 158, the removable base not being shown for convenience of illustration, and being provided so that the ingot 161 may be removed from the mold, or if desired the member 159 may provide the bottom of the mold, and when the member 159 reaches the lower end of wall portion 157 of the mold as a result of the elongation of the ingot 161, the ingot may be removed therefrom. Ingot 161 is shown as having a molten pool 162 with charge material 163 being added thereto through the charging means 164 located in the top of the mold, it being understood that the charging means 164 may be connected to hopper means, not shown for convenience of illustration. The material in the molten pool 162 is reduced to its molten state by heat from arc 165 shown as taking place between two electrodes 166 and 167, passing through the side walls of the mold and being insulated therefrom by insulating members 168 and 169 respectively. Chamber 170 is evacuated by a pump 171 connected thereto by conduit means 172.

It will be understood that in a continuous casting process utilizing the apparatus of FIG. 8, the charge feed rate and ingot movement are coordinated, thus reducing the cost of handling and placing consumable electrodes, and also reducing ingot end losses.

It will be understood that the mold 158 may be fluid cooled if desired or contain an inner lining or refractory material if desired, or both, these not being shown for convenience of illustration. As previously stated one advantage of the use of non-consumable electrodes 166 and 167, which may be similar to those previously described, is that chamber 170 may be evacuated to a much lower level than would be possible where it was desired to operate a graphite electrode, as a non-consumable electrode, so that the chamber may be evacuated to a point limited only by the basic materials of the molten pool 162 with the result that impurities having vaporizing pressures above this pressure level are removed by the vacuum pump 171.

Particular reference is made now to FIG. 9 where a mold 175, which may be cooled by fluid means not shown, and which may include an inner wall of refractory material, not shown, has two electrodes 176 and 177 passing through insulating portions 178 and 179 respectively in the side walls of the mold and having an arc 180 therebetween. As seen, one of the electrodes, 176, has an axial passageway 181 extending therethrough through which material 182 is fed to the molten pool portion 183 of ingot 184. The chamber 185 of mold 175 is connected by conduit means 186 to a vacuum pump, not shown for convenience of illustration. Mold 175 is shown as having a detachable base 187 and as having therearound a field coil for setting up a magnetic field to stir the melt, such a practice being well known in the prior art, the field coil being designated 188.

It will be understood that both of the electrodes may have axial passageways therethrough through which material may be fed to the molten pool within the mold.

Particular reference is made now to FIG. 10 where mold 222 has extending thereinto two coaxially disposed electrodes generally designated 195 and 196 electrically insulated from each other passing through insulation 197 in the upper wall or top of the mold and having an arc 198 produced therebetween. Electrode 195 may be similar to those previously described, having axial passageway 199 therethrough which is connected by conduit 200 to a vacuum pump 201 for evacuating the chamber 202 by way of the central passageway through electrode 195. Electrode 196 is seen as including, if desired, four generally coaxial cylindrical wall portions 211, 212, 213 and 214 forming a fluid passageway 215 for bringing cooling fluid to and from the arcing surface and having the field coil 216 therein which is energized to set up a force to rotate the aforementioned arc 198. Electrodes 195 and 196 may be maintained in spaced position with respect to each other by support member 217 providing a cylindrical passageway 218 through which feed material 219 is fed to molten pool 220 of the ingot 221 disposed in mold 222. The aforementioned cylindrical passageway 218 between electrodes may be connected by conduit means 223 to a hopper, not shown for convenience of illustration, for containing the feed material. It will be understood that the feed material may be fed through the passageway 218 at a number of peripherally disposed paths therein, or feed material may be fed throughout substantially the entire annular passageway, suitable conduit means 223 being provided for connecting the passageway to the feed hopper.

Figure 11:
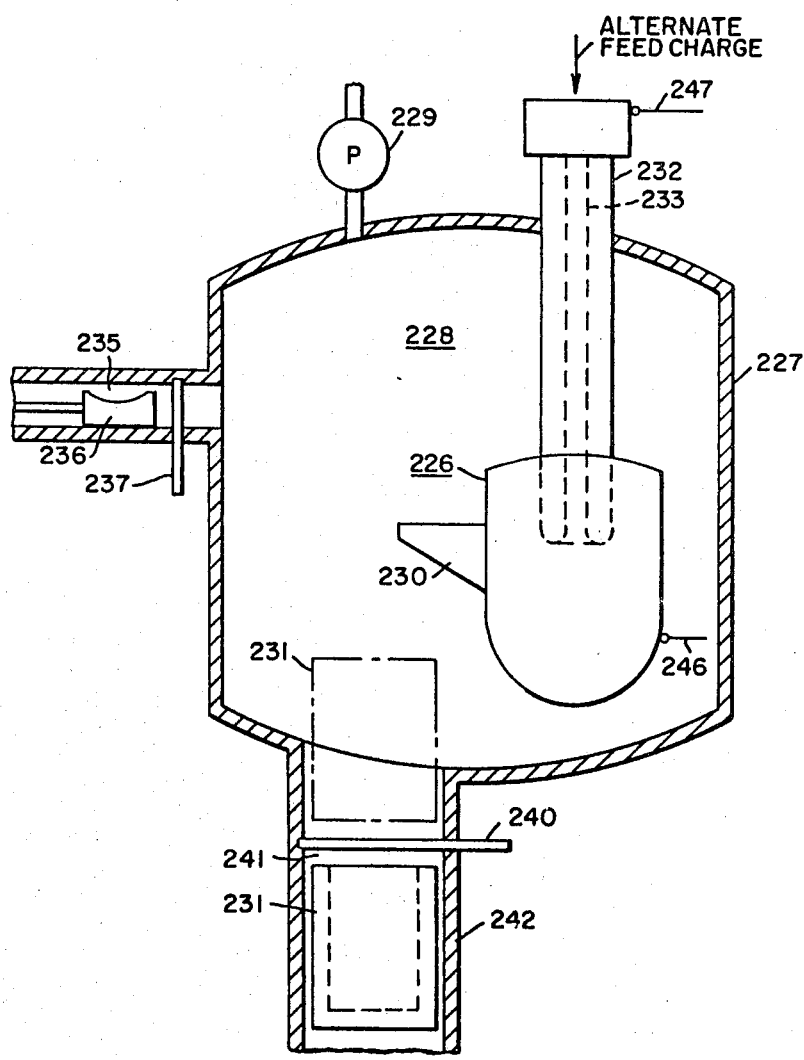
FIG. 11 shows a skull furnace according to my invention which may be employed for forming a single ingot, with alternate means of feeding charge to the skull furnace.

Particular reference is made now to FIG. 11 showing other apparatus embodying my invention for practicing processes of metal treatment according to my invention. A skull furnace is generally designated 226 and disposed within chamber forming means 227. A vacuum chamber 228 formed therein is evacuated by pump 229. Furnace 226 is seen to have a pouring spout 230 and a ladle 231 both enclosed within the vacuum chamber, and the material in the furnace 226 is reduced to a molten condition by an arc thereto from non-consumable electrode 232 which may be similar to non-consumable electrode hereinbefore described having an axially extending central passageway 233 which may be used for feeding material into the furnace 226, it being understood that the electrode 232 includes means for closing the upper end of the passageway therethrough to insure that the vacuum in chamber 228 is maintained.

Alternately, material may be fed to furnace 226 through the locking chamber 235, it being understood that suitable means, not shown for convenience of illustration is provided for conveying the material brought in by feed means 236 to the furnace 226. Locking means 237 is provided for restoring the seal to the vacuum chamber after the feeding of material is complete.

The aforementioned pouring ladle is shown in dashed outline at 231 within the vacuum enclosure; it moves through the lock 240 to a lower portion 241 of passageway forming means 242 once the ladle 231 at least partially filled with purified molten material, and is thence removed.

It will be understood that means, not shown for convenience of illustration, is provided for forming an electrical connection to the furnace 226 symbolized by lead 246, the electrical connection to the electrode 232 being symbolized by lead 247, these being connected to terminals of opposite polarity of a source of potential for producing an arc from the electrode 232 to the melt in furnace 226 which has at least some electrically conductive characteristic.

Figure 12:
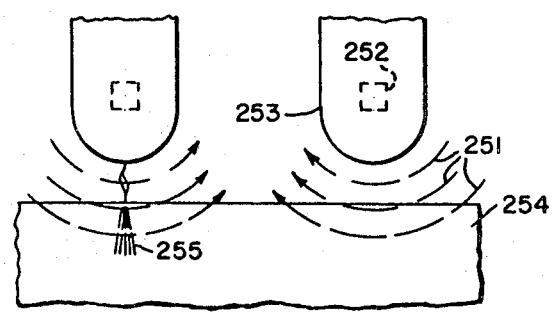
FIG. 12 is a diagrammatic view illustrating how the magnetic field in the non-consumable electrode which I employ assists in stirring the melt.

Particular reference is made now to FIG. 12, illustrating the effect of the magnetic field 251 set up by the field coil 252 within the electrode 253 has in stirring the melt 254. The arc current path is illustrated at 255. The stirring of the melt by the magnetic field produces a more homogeneous melt, assists in bringing to the surface impurities which may be vaporized as a result of the vacuum atmosphere, and where materials are mixed to form an alloy, the stirring of the melt assists in the distribution of materials to form an alloy of uniform construction.

Mold 123, FIG. 7, and mold 222, FIG. 10, may have movable bottoms corresponding to bottom 159, FIG. 8, so that continuous casting may be done with these electrode configurations.

By way of further summary of the processes of my invention which may be practiced by certain embodiments of apparatus heretofore described which are suitable therefor, but which processes may be practiced by other suitable apparatus, with particular reference to FIG. 2 the process of my invention includes the steps of transferring successive portions of a molten metal to be purified to a vacuum chamber, utilizing an electric arc to add heat to the portion of the metal in the vacuum chamber to maintain said portion at a desired temperature, the vacuum chamber being evacuated to a pressure at which the impurities are vaporized, and removing the vaporized impurities from the vacuum vessel. The invention further includes the process of utilizing at least one non-consumable electrode disposed in the vacuum chamber for forming the electric arc, no substantial vaporization of material from the electrode arcing surface which produces the electric arc occurring. The process further includes the step of forming an electric arc to the molten material in the vacuum chamber. The process further includes the use of direct current to produce the arc, in which the non-consumable electrode is connected in the electric circuit to form the anode. The process further includes the additional step of adjusting the position of the non-consumable electrode with respect to the molten material in the vacuum chamber as the level of the molten material changes therein. The process further includes using two coaxially disposed non-consumable electrodes each producing an arc to the molten material in the vacuum chamber to supply heat thereto, or producing one arc between each other. The process further includes three coaxial electrodes connected to a three phase source and producing three arcs to the molten material in the vacuum chamber, and also the use of three non-consumable electrodes which may be disposed in a triangular pattern connected to a three phase source for producing three arcs to the molten material in the vacuum chamber to supply heat thereto and control the temperature of the molten material in the vacuum chamber to thereby maintain at a temperature most conductive to the removal of impurities therefrom having vapor pressures greater than the pressure to which the vacuum chamber has been evacuated.

My invention further includes producing a vacuum in the vacuum chamber limited only by the pressure at which substantial evaporation of material from the arcing surface or surfaces producing the arc occurs.

The aforedescribed process includes the step of mixing the degassed metal with the balance of metal which has a higher gas content. The process also includes the step of utilizing the pressure of the atmosphere to force molten metal into the vacuum vessel.

A process of my invention which may be practiced by the apparatus of FIG. 7 and by other apparatus includes feeding particulate material into an evacuated mold, utilizing a non-consumable electrode with a fluid-cooled arcing surface to produce an arc to heat the material and form a molten pool, the non-consumable electrode having field coil means therein to substantially continuously move the arc and stir the material in the molten pool, and gradually withdrawing the electrode as a solid ingot forms under the molten pool, impurities in the material in the particulate charge vaporizing at the low pressure in the evacuated mold and being removed therefrom by vacuum suction. The process includes the further step of feeding the particulate charge around the outside diameter of the electrode. The process further includes the step of feeding charge to the molten pool through a central axial aperture passing through the electrode. The process further includes the step of feeding additional material into the evacuated mold along the inside wall thereof. The process also includes utilizing two concentric non-consumable electrodes having an arc therebetween near the molten pool to supply heat to the molten pool and feeding particulate charge through the space between electrodes.

The process also includes the use of two non-consumable electrodes passing through the side walls of the evacuated mold, at least one of said electrodes having a central passageway therethrough, and feeding material through said central passageway to the molten pool. The process also includes in combination with additional steps heretofore related, the use of a field coil around the outside of a mold composed of non-magnetic material for stirring the molten material of the pool.

A continuous casting process of my invention may be practiced by the apparatus shown in FIG. 8 and includes the steps of forming an arc between a pair of non-consumable electrodes in an evacuated mold, the mold having a retractable base portion, feeding particulate charge into the mold to first form a pool of molten metal on the base portion, vaporized impurities being removed from the molten pool by vacuum action, and thereafter retracting the movable base portion as a hardened ingot forms in the mold, the rate of retraction being coordinated with the rate of charge material feed and the growth of the hardened portion of the ingot to maintain the level of the molten pool at a desired level with respect to the arc supplying heat thereto. The molds of FIGS. 7 and 10, for example, may have retractable base portions to permit continuous casting.

A process of my invention which may be practiced with the apparatus shown in FIG. 12 is to utilize a non-consumable electrode having a field coil therein near the arcing surface to produce an arc to a melt, and energizing the field coil to substantially continuously rotate the arc around the arcing surface, the rotation of the arc causing stirring of the melt and resulting in a more homogeneous melt.

A process according to my invention which may be practiced utilizing the apparatus of FIG. 11 and other apparatus includes producing a molten pool of metal in a skull furnace enclosed within the vacuum chamber by producing an electric arc to the material while feeding charge to the furnace and thereafter pouring an ingot of the molten material from which impurities having a vapor pressure higher than the pressure within the vacuum chamber have been removed, and thereafter removing the ingot from the vacuum chamber. A further step in the above-described process includes utilizing a substantially non-consumable electrode to heat the material without substantial contamination. A further step includes evacuating the chamber to a pressure level the limit of which is set only by evaporation of material from an arcing surface of a fluid cooled arc-rotating non-consumable electrode. A further step includes utilizing a non-consumable electrode with a passageway therethrough for feeding charge to the furnace.

While the use of a particulate charge material is convenient, the charge may be in molten form, or in lumps somewhat larger than particulate.

In the claims appended hereto, the term "vapor pressure" when used with respect to an impurity to be removed, includes partial pressure.

Whereas certain processes have been described briefly in summary form hereinabove and whereas apparatus has been described hereinabove and shown in the accompanying drawings suitable for practicing the processes, it should be understood that the drawings and the written description are exemplary and illustrative only and should not be interpreted in a limiting sense.

I claim as my invention:

1. A metal treating apparatus for removing impurities from a metal to be treated comprising an enclosed at least partially evacuated chamber adapted to have molten metal forced thereinto through an opening therein for treatment for the removal by degassing of impurities having a vapor pressure at the temperature of the molten metal greater than the pressure within the vacuum chamber, and means for producing an electric arc of controllable power within the vacuum chamber to prevent loss of heat from the molten metal within the vacuum chamber during the degassing operation, said means including at least one non-consumable electrode adapted to be electrically connected to a source of potential to produce an arc therefrom, the electrode including means forming a fluid cooled arcing surface and an energized magnetic field coil therein near the arcing surface to substantially continuously move the arc around the arcing surface, the substantially continuous movement of the arc assisting in preventing any substantial evaporation of material from the arcing surface and resulting in a more even distribution of heat to the molten metal within the vacuum chamber.

2. Apparatus according to claim 1 wherein the vacuum chamber is additionally characterized as including a metal shell having a lining of refractory material on the inside thereof, said lining having at least one aperture therein whereby the molten metal makes electrical contact with the shell, means for connecting said shell to one terminal of said source of potential, and means for connecting said electrode to the other terminal of the source of potential, the arc taking place between the electrode and the molten metal.

3. Apparatus according to claim 1 including means for adjusting the position of the electrode in accordance with the level of molten metal within the vacuum chamber.

4. Apparatus according to claim 1 including in addition means external to the vacuum chamber for adjusting the power of the arc.

5. A metal treating apparatus for removing impurities from a metal to be treated comprising an enclosed at least partially evacuated chamber adapted to have molten metal forced thereinto through an opening therein for treatment for the removal by degassing of impurities having a vapor pressure at the temperature of the molten metal greater than the pressure within the vacuum chamber, and means for producing an electric arc of controllable power within the vacuum chamber to prevent loss of heat from the molten metal within the vacuum chamber during the degassing operation, said means including at least one non-consumable electrode adapted to be electrically connected to a source of potential to produce an arc therefrom, the electrode including means forming a fluid cooled arcing surface and an energized magnetic field coil therein near the arcing surface to substantially continuously move the arc around the arcing surface, the substantially continuous movement of the arc assisting in preventing any substantial evaporation of material from the arcing surface and resulting in a more even distribution of heat to the molten metal within the vacuum chamber, a second non-consumable electrode, the second non-consumable electrode being generally cylindrical in shape with an inside diameter greater than the outside diameter of the first named electrode, the second non-consumable electrode being mounted outside the first named electrode substantially coaxially therewith, electrically insulated therefrom and extending into the vacuum chamber, the second non-consumable electrode having means forming a fluid cooled arcing surface and a field coil for moving an arc thereover, the first named and second non-consumable electrodes being adapted to be connected to at least one source of potential to produce at least one arc from the electrodes to supply heat to the metal within the vacuum chamber and thereby maintain the temperature of the molten metal within the vacuum chamber within predetermined temperature limits during the degassing process.

6. Apparatus according to claim 5 in which the opening in the vacuum chamber is additionally described as being in the bottom thereof for the admission of molten metal, the first named and second non-consumable electrodes extend through the top of the vacuum chamber, and the first named and second non-consumable electrodes produce two arcs from the electrodes respectively to the molten metal.

7. Apparatus according to claim 5 including in addition a third non-consumable electrode, the third non-consumable electrode being generally cylindrical in shape and having an inside diameter greater than the outside diameter of the second non-consumable electrode, the third non-consumable electrode being mounted outside the second non-consumable electrode substantially coaxially therewith and electrically insulated therefrom, the third non-consumable electrode having means forming a fluid cooled arcing surface and a magnetic field coil disposed therein near the arcing surface for producing a magnetic field which causes an arc from the third non-consumable electrode to be substantially continually moved over the arcing surface.

8. Apparatus according to claim 7 including a three phase source of alternating current potential and means for connecting the first named, second and third non-consumable electrodes to the three phases of the three phase source.

9. Apparatus according to claim 7 in which the first named, second and third coaxial electrodes are described as being movable in unison to adjust the positions of the electrodes within the vacuum chamber in accordance with the level of the molten metal therein.

10. A metal treating apparatus for removing impurities from a metal to be treated comprising an enclosed at least partially evacuated chamber adapted to have molten metal forced thereinto through an opening therein for treatment for the removal by degassing of impurities having a vapor pressure at the temperature of the molten metal greater than the pressure within the vacuum chamber, and means for producing an electric arc of controllable power within the vacuum chamber to prevent loss of heat from the molten metal within the vacuum chamber during the degassing operation, said means including first and second non-consumable electrodes extending into the vacuum chamber and electrically insulated therefrom, each of the electrodes including means forming a fluid cooled arcing surface and a magnetic field coil disposed near the arcing surface for producing a magnetic field to move the arc, the first and second electrodes being adapted to be electrically connected to terminals of opposite polarity of a source of potential to produce and sustain an arc therebetween, the magnetic fields causing the arc to move substantially continuously over the arcing surfaces of both of the electrodes, said arc supplying heat to the molten metal within the vacuum chamber thereby preventing a fall in temperature of said metal while in the chamber.

11. Apparatus according to claim 10 including at least one other additional electrode for producing an additional arc within the vacuum chamber.

* * * * *